(12) United States Patent
Sheperek et al.

(10) Patent No.: US 11,210,154 B2
(45) Date of Patent: *Dec. 28, 2021

(54) DATA-STRUCTURE BASED DYNAMIC PROGRAM TARGETING CONTROL

(71) Applicant: Micron Technology, Inc., Boise, ID (US)

(72) Inventors: Michael Sheperek, Longmont, CO (US); Bruce A. Liikanen, Berthoud, CO (US); Larry J. Koudele, Erie, CO (US); James P. Crowley, Longmont, CO (US); Stuart A. Bell, Fort Collins, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/100,825

(22) Filed: Nov. 21, 2020

(65) Prior Publication Data
US 2021/0073061 A1 Mar. 11, 2021

Related U.S. Application Data

(63) Continuation of application No. 16/170,748, filed on Oct. 25, 2018, now Pat. No. 10,877,832.

(51) Int. Cl.
*G06F 11/00* (2006.01)
*G06F 11/07* (2006.01)
*G06F 3/06* (2006.01)

(52) U.S. Cl.
CPC ............ *G06F 11/076* (2013.01); *G06F 3/064* (2013.01); *G06F 3/0619* (2013.01); *G06F 3/0673* (2013.01); *G06F 11/0727* (2013.01); *G06F 11/0793* (2013.01)

(58) Field of Classification Search
CPC .............. G06F 11/076; G06F 11/0727; G06F 11/0793; G06F 11/0703; G06F 11/073; G06F 11/0751; G06F 11/0754; G06F 3/0619; G06F 3/064; G06F 3/0673; G06F 3/0614; G06F 3/0679; G06F 3/0683; G06F 3/0688; G06F 12/02; G06F 12/0207; G06F 12/0223; G06F 12/023; G06F 12/0238; G06F 12/0246; G06F 12/08; G06F 12/0802; G06F 9/3004; G06F 9/30043; G06F 9/3834; G11C 16/0483; G11C 16/06;
(Continued)

(56) References Cited

U.S. PATENT DOCUMENTS 9,025,374 B2 * 5/2015 Yang .................... G11C 29/021
365/185.02
9,431,121 B2 * 8/2016 Muchherla .......... G11C 11/5642
10,699,791 B2 * 6/2020 Pletka .................... G06F 11/073
(Continued)

*Primary Examiner* — Anthony J Amoroso
(74) *Attorney, Agent, or Firm* — Perkins Coie LLP

(57) ABSTRACT

Feedback relating to errors in memory operations on a plurality of memory cells is received by a memory subsystem. At least one processing level corresponding to a program distribution is updated based on the feedback to adjust an error measure between pages of the plurality of memory cells and to adjust a read window budget within a page of the plurality of cells. The updating of the at least one processing level is based on information for the at least one processing level that is stored in a data-structure.

20 Claims, 6 Drawing Sheets

(58) Field of Classification Search
CPC ..... G11C 16/26; G11C 16/34; G11C 16/3404; G11C 11/5628; G11C 11/5642
See application file for complete search history.

(56) References Cited

U.S. PATENT DOCUMENTS

| | | | |
|---|---|---|---|
| 2013/0132652 A1* | 5/2013 | Wood | G06F 3/0629 711/103 |
| 2013/0227200 A1* | 8/2013 | Cometti | G06F 3/0629 711/103 |
| 2016/0148702 A1* | 5/2016 | Karakulak | G11C 29/021 365/185.12 |
| 2020/0133754 A1 | 4/2020 | Sheperek et al. | |

* cited by examiner

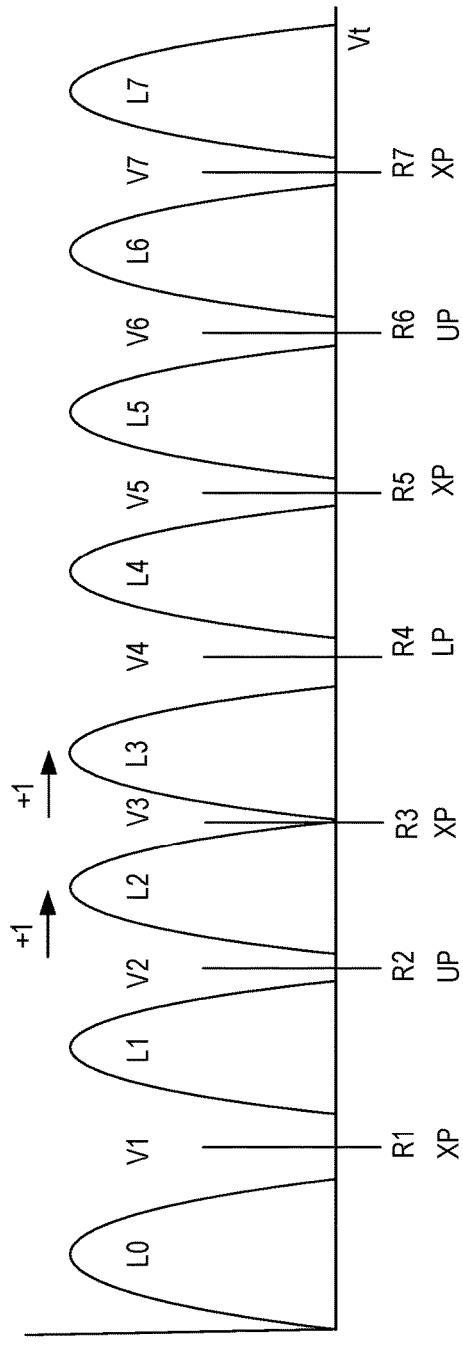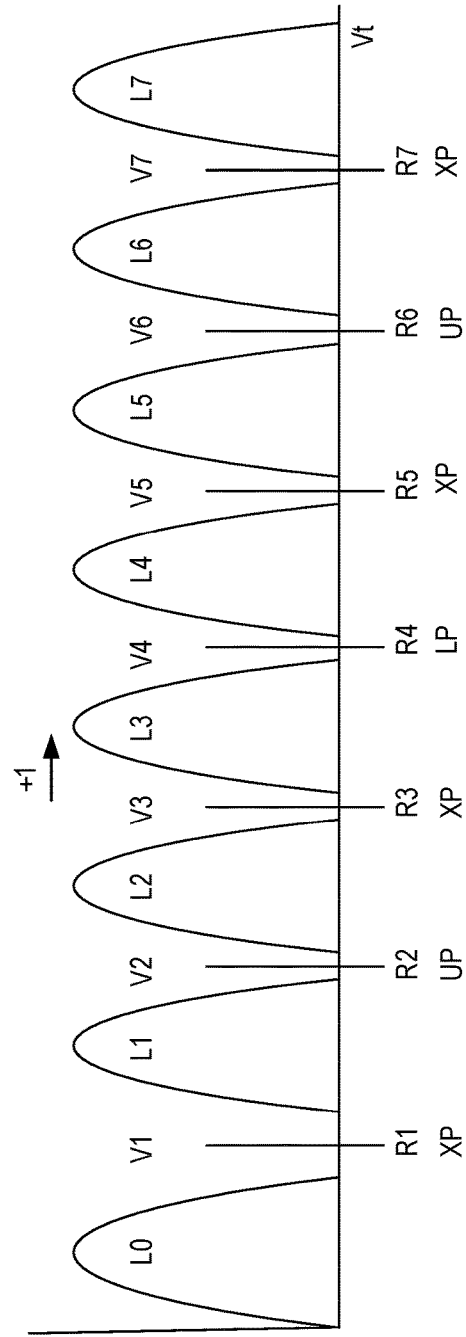
FIG. 4C
FIG. 4D

DATA-STRUCTURE BASED DYNAMIC PROGRAM TARGETING CONTROL

CROSS-REFERENCE TO RELATED APPLICATION(S)

This application is a continuation of U.S. application Ser. No. 16/170,748, filed Oct. 25, 2018; which is incorporated herein by reference in its entirety.

TECHNICAL FIELD

Embodiments of the disclosure generally relate to memory sub-systems, and more specifically, relate to data-structure based dynamic program targeting control in a memory component of a memory sub-system.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIGS. 4A-4D illustrate a shifting or program distributions, in accordance with some embodiments of the present disclosure.

DETAILED DESCRIPTION

Figure 1:
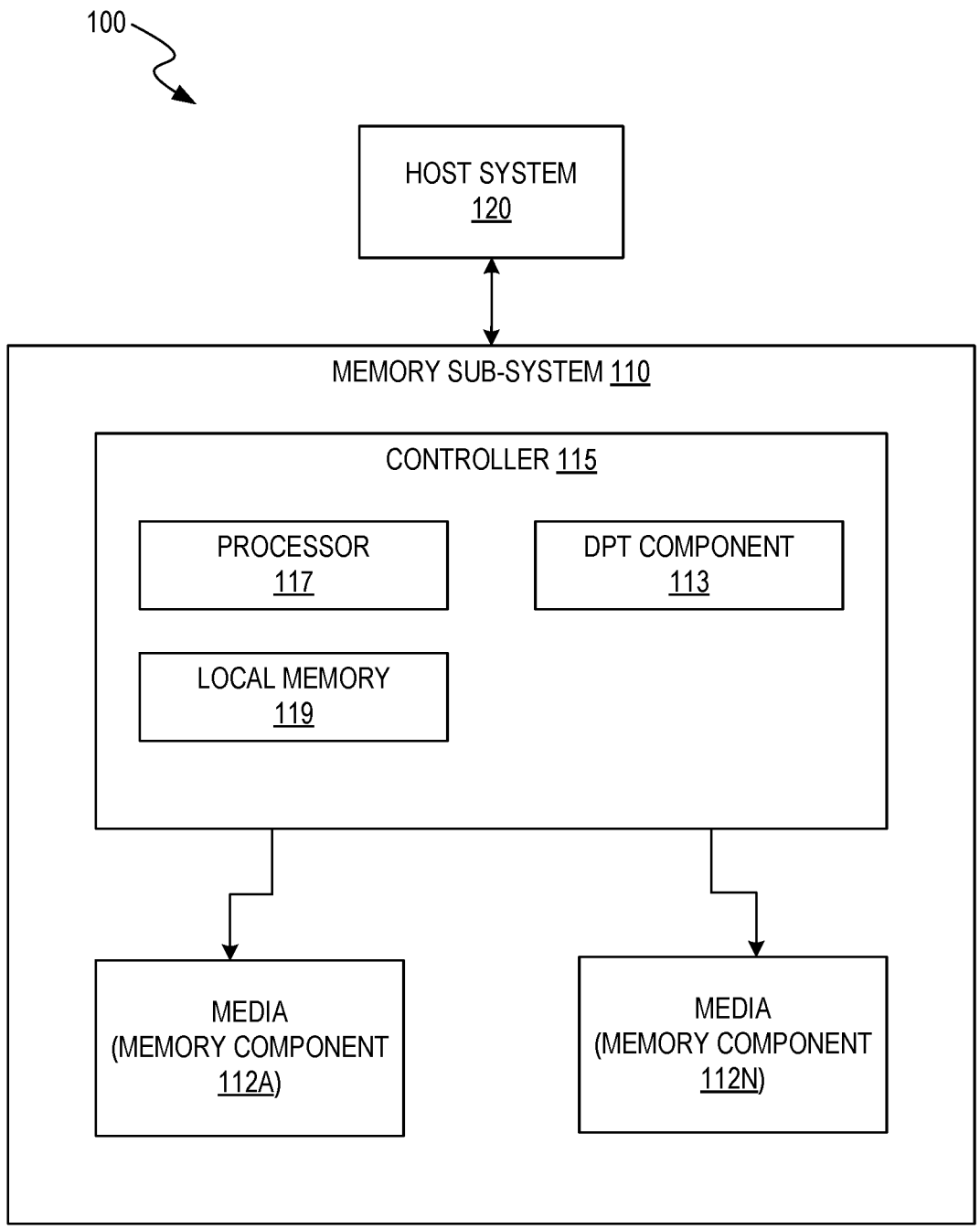
FIG. 1 illustrates an example computing environment that includes a memory sub-system in accordance with some embodiments of the present disclosure.

Aspects of the present disclosure are directed to providing data-structure based dynamic program targeting (DPT) control in a memory sub-system. A memory sub-system is also hereinafter referred to as a "memory device." An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can provide data to be stored at the memory sub-system using write (also hereinafter referred to as "program") requests and can retrieve data from the memory sub-system using read requests. Preferably, the memory sub-system can include multiple memory components that can store data from the host system. Each memory component can include a different type of media. Examples of media include, but are not limited to, a cross-point array of non-volatile memory and flash based memory such as single-level cell (SLC) memory, triple-level cell (TLC) memory, and quad-level cell (QLC) memory.

Memory components, such as flash based memory, utilize electrical energy, along with corresponding threshold levels or processing voltage levels, to store and access data. During operation of the memory components, electrical characteristics of the memory components (i.e. charge retention capabilities) can change due to repeated data writes, erase, and/or reads. In addition, the electrical characteristics of the memory components can change due to changes in operating temperature of the memory component, which can occur because of, for example, ambient temperature changes and/or heat generated by the memory component during operation. The changes in the electrical characteristics can lead to a shift in the threshold voltage distributions (also hereinafter referred to as "program distributions") in the flash-based memory, which can adversely affect memory operations, such as, for example, read operations, write operations, and/or erase operations. Write operations are also hereinafter referred to as "program verify (PV) operations." If the changes in the electrical characteristics are not properly compensated, the shift in the program distributions can cause performance and reliability issues by, for example, increasing the error count and/or the error rate of memory operations.

A conventional memory sub-system can have memory components with calibration circuits to provide voltage adjustments (also hereinafter referred to as "trims") for compensating the gate voltage levels at the memory cells during memory operations to account for a shift in the program distributions (and any associated performance/reliability issues). The calibration procedure can include applying the trims to the appropriate gate voltage level when performing read operations and PV operations to minimize errors associated with the memory operations. While these read calibration operations can provide calibrated read levels that reduce the errors, the error count and/or error rate may still not be optimal and the memory sub-system can still experience performance issues.

In addition, in conventional memory sub-systems, calibration operations for adjusting program-verify target levels (hereinafter "PV target levels") to account for the shift in the program distributions are "hard-coded" into the firmware of each memory sub-system. Further, the firmware can be media-type dependent, which can mean that separate firmware is needed for calibration operations on SLC memory, TLC memory, QLC memory, and other higher-density memories. Accordingly, there is limited flexibility in adjusting the PV target level in conventional memory sub-systems, which can lead to poor performance and/or reliability in the memory sub-system due to, for example, high error counts and/or high error rates during memory operations.

Aspects of the present disclosure address the above and other deficiencies by providing a data-structure based DPT component to control program distributions of memory cells of a memory sub-system. In some embodiments, a memory sub-system can include a DPT component that provides trims to control the shifting of program distributions, including the magnitude, direction, and/or rate of the shifting, based on information in a data-structure. The data-structure based DPT component can be media-type independent such that the same DPT component firmware can be used for SLC memory, TLC memory, and QLC memory.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory system 110 so that the host system 120 can read data from or write data to the memory system 110. The host system 120 can be coupled to the memory system 110 via a physical host interface. As used herein, "coupled to" generally refers to a connection between components, which can be an indirect communicative connection or direct communicative connection (e.g., without intervening components), whether wired or wireless, including connections such as, electrical, optical, magnetic, etc. Examples of a physical host interface include, but are not limited to, a serial advanced technology attachment (SATA) interface, a peripheral component interconnect express (PCIe) interface, universal serial bus (USB) interface, Fiber Channel, Serial Attached SCSI (SAS), etc. The physical host interface can be used to transmit data between the host system 120 and the memory system 110. The host system 120 can further utilize an NVM Express (NVMe) interface to access the memory devices 112A to 112N when the memory system 110 is coupled with the host system 120 by the PCIe interface. The physical host interface can provide an interface for passing control, address, data, and other signals between the memory system 110 and the host system 120.

The memory components 112A to 112N can include any combination of the different types of non-volatile memory devices and/or volatile memory devices. An example of non-volatile memory devices includes a negative-and (NAND) type flash memory. Each of the memory devices 112A to 112N can include one or more arrays of memory cells such as single level cells (SLCs), multi-level cells (MLCs) (e.g., triple level cells (TLCs), or quad-level cells (QLCs)). In some embodiments, a particular memory component can include both an SLC memory portion and a MLC memory portion. Each of the memory cells can store one or more bits of data (e.g., data blocks) used by the host system 120. Although non-volatile memory devices such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross point non-volatile memory can perform a write in-place operation, where a non-volatile memory cell can be programmed without the non-volatile memory cell being previously erased. Furthermore, the memory cells of the memory devices 112A to 112N can be grouped as memory pages or data blocks that can refer to a unit of the memory device used to store data.

The memory system controller 115 (hereinafter referred to as "controller") can communicate with the memory devices 112A to 112N to perform operations such as reading data, writing data, or erasing data at the memory devices 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 130 configured to execute instructions stored in local memory 122. In the illustrated example, the local memory 122 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 122 can include memory registers storing memory pointers, fetched data, etc. The local memory 122 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N. Each of the memory components 112A to 112N can include one or more dies.

The memory sub-system 110 includes a DPT component 113 that can operably interface to a data-structure (or data-structures) to adjust characteristics of memory cells based on memory operations. For example, the DPT component 113 can operably interface to a data-structure (or data-structures) that contains information related to, for example, changing a magnitude, a direction, and/or a rate of a characteristic of one or more memory cells. The characteristic of the memory cells can be, for example, a threshold voltage level corresponding to a read operation, a PV operation, and/or an erase operation for the memory cells. The memory cells can correspond to, for example, a page type, a logical or stored value, a word line group (WLG), a word line, a memory component, or any combination thereof. In some embodiments, the controller 115 includes at least a portion of the DPT component 113. For example, the controller 115 can include a processor 117 (processing device) configured to execute instructions stored in local memory 119 for performing the operations described herein. In some embodiments, the DPT component 113 is part of the host system 110, an application, or an operating system.

The DPT component 113 can receive data related to memory operations on memory cells in memory components 112A to 112N and change the characteristics of the memory cells based on the received data. For example, in some embodiments, the DPT component 113 can receive an error measure relating to memory operations for a group of memory cells. The error measure can be received from, for example, operations executed on the memory sub-system 110 and/or the host system 120 that measure a success and/or a failure of memory operations (e.g., read, write, and/or erase operations). In some embodiments, the error measure can be calculated by the DPT component 113. The error measure can represent a degree, a frequency, an amount or magnitude, a size or number, a processing derivation of errors, or a combination thereof describing errors related to the memory operations. For example, the error measure can include an error count, an error rate, or a combination thereof. The error count can represent an amount or magnitude, a degree, a size or number, or a combination thereof describing the errors. For example, the error count can be a bit error count (BEC). The error rate can represent a frequency or a probability of occurrence of the errors, a proportional amount or a percentage of errors, or a combination thereof. For example, the error rate can include a bit error rate (BER). The error measure can correspond to one or more units or groupings within the memory cells of the memory component. For example, the error measure can be for one or more of memory pages, word-line groups, memory components, or any combination thereof corresponding to the memory cells. Also for example, the error measure can correspond to the page type, such as for the lower page (LP), the upper page (UP), the extra page (XP), or the top page (TP). The error measure can be calculated or tracked by operations executed in the host device 120, the controller 115, or a combination thereof. The error measure can be stored in the host device 120, local memory 119, one or more of memory components 112A to 112N, another memory location of the memory sub-system 110, or any combination thereof.

In some embodiments, the DPT component 113 receives feedback information related to errors (e.g., an error measure) during memory operations. For example, the feedback information can include an error count and/or an error rate corresponding to read operations on one or more memory cells. The feedback information can be received from, for example, operations executed on the memory sub-system 110 and/or the host system 120 that measure a success and/or a failure of memory operations (e.g., read, write, and/or erase operations). In some embodiments, the feedback information can be calculated by the DPT component 113. Based on the received feedback information, the DPT component 113 changes threshold voltage characteristics of the memory cells to adjust an error measure between a group of memory cells in accordance with information stored in a data-structure, such as, for example, a look-up-table (LUT). For example, the adjustment can include equalizing (also referred to herein as "balancing") the error measure between a group of memory cells in accordance with information stored in a data-structure, such as, for example, a LUT. As used herein "equalize" and "balance" mean that the values being compared are within a predetermined deadband and/or an operation involving adjustments to a program distribution enters a dither condition. The data-structure can be located in local memory 119, in one or more of memory components 112A to 112N, in some other memory in memory sub-system 110, in the host system 120, or in any combination thereof. In addition, the data-structure can be in volatile or non-volatile memory.

In some embodiments, the changing of the characteristics of the memory cells in memory components 112A to 112N can include shifting the program distributions for a group of memory cells to equalize an error measure (e.g., BEC, BER, etc.) between the group of memory cells. The DPT component 113 can operably be coupled to a data-structure (e.g., LUT) that holds information for shifting one or more of the program distributions. For example, the data-structure can include information relating to a trim for a PV target level that shifts the corresponding program distribution in subsequent PV operations to equalize the error measure.

The trim information (hereinafter also referred to as "PV target level trim information") can include information related to the magnitude and direction of the shift change and/or a rate of change (also referred to herein as "bandwidth") of the shift of the program distributions. The information can be, for example, a voltage value representing the amount and/or direction to shift the program distribution and can be given in, for example, millivolts (mV) and/or ticks. A tick can correspond to a minimum threshold voltage adjustment of the memory sub-system 110 (e.g., due to the granularity of an analog-to-digital converter (ADC)).

By adjusting the PV target levels, the program distributions can be shifted when the memory sub-system 110 performs subsequent PV operations using the new PV target levels. To access the data-structure, the DPT component 113 can include pointers that identify the location where the data-structure is stored in memory. The data-structure can be stored in, for example, local memory 119, one or more of memory components 112A to 112N, memory in host system 120, other memory in memory sub-system 110, or any combination thereof.

In some embodiments, the DPT component 113 can use the PV target level trim information to adjust (e.g., equalize) the error measure between page types (e.g., LP, UP, and XP page-types in TLC type memory cells) and/or adjust (e.g., equalize) the read window budget (RWB) by valley within each page type. The RWB relates to a separation between a read level voltage used in read operations and voltages corresponding to adjacent logic states. Further details with regards to the operations of the characteristic component 113 are described below.

Figure 2:
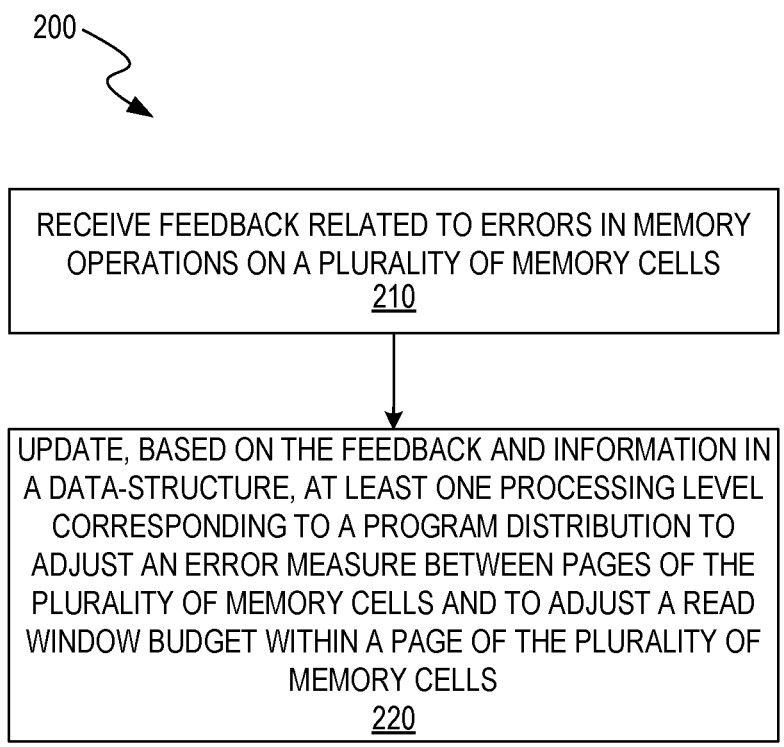
FIG. 2 is a flow diagram of an example method to provide data-structure based dynamic program targeting control in accordance with some embodiments of the present disclosure.

FIG. 2 is a flow diagram of an example method 200 to shift a program distribution based on information stored in a data-structure, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the DPT component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 210, the processing device receives feedback related to errors in memory operations on one or more memory cells. For example, the feedback can be an error measure (e.g., a BER, a BEC, etc.) that is related to one or more program distributions. In some embodiments, as discussed below, the feedback relates to a center error count and/or a differential error count. The memory operations can be, for example, read, program, and/or erase operations. For example, the feedback can relate to an error count associated with read operations. The feedback can be received from, for example, operations executed on the memory sub-system 110 and/or the host system 120 that measure a success and/or a failure of memory operations (e.g., read, write, and/or erase operations). In some embodiments, the information used in the feedback can be calculated by the DPT component 113. The memory cells can correspond to memory cells of a same page type, such as, for example, a LP level page, a UP level pages, a XP level page, a TP level page, etc., depending on the type of memory cells.

At block 220, the processing device updates, based on the feedback and information stored in the data-structure, at least one processing level corresponding to a program distribution to adjust an error measure between pages of the memory cells and to adjust a read window budget within a page of the memory cells. In some embodiments, the adjusting of the error measure equalizes the error measure between pages of the plurality of memory cells. In some embodiments, the adjusting of the read window budget equalizes read window budgets within the page. Processing level means the threshold voltage used for performing a memory operation (e.g., a read operation, a PV operation, or an erase operation) on a memory cell. For example, for TLC-type memory, the processing level is the respective threshold voltage corresponding to level L0 to level L7 for a given type of memory operation. For example, in a write memory operation, the processing level corresponds to the target voltage levels used for verifying that the memory cell is at the charge level corresponding to a desired program distribution (e.g. level L0 to level L7 in a TLC-type memory).

Updating the processing level can include changing (e.g., shifting) the threshold voltage level values corresponding the program distribution based on an error measure of a memory operation (e.g., a read memory operation). For example, updating the processing levels can include comparing the error measure (e.g., BER, BEC, etc.) between pages of memory cells. Depending on the type of memory (e.g., MLC, QLC, TLC, etc.), the error measure on of the LP page can be respectively compared to the error measures of the other pages (e.g., LP to UP, LP to XP, LP to TP, etc.). If the LP page has a lower error measure than the other page (e.g., UP, XP, TP, etc.), the program distribution level on the other page (e.g., UP, XP, TP, etc.) having the largest RWB determines how the processing levels are to be shifted (if at all) in order to adjust (e.g., to equalize) the RWB within a page and/or the error measure between page types. If the LP page has a higher error count than the other page (e.g., UP, XP, TP, etc.), the program distribution level on the other page having the smallest RWB determines how the processing levels are to be shifted (if at all) in order to adjust (e.g., to equalize) the RWB within a page and/or the error measure between page types. Exemplary embodiments that update processing levels are described in more detail below.

The updating can be based on trim information for the at least one processing level that is stored in a data-structure. For example, the data-structure can be a LUT and can include trim information for adjusting a target level such as, for example, a PV target level. The PV target level trim information can include, for example, information related to a magnitude and a bandwidth of the desired shift in the program distributions in, for example, mVs or ticks. Further details with regards to the method of operation of the memory sub-system 110, including DPT component 113, are described below.

As discussed above, program distributions can shift during operation of the memory sub-system 110. The shift in the program distributions can result in errors when performing memory operations, which can adversely affect the performance of the memory sub-system 110. The memory sub-system 110 can track an error measure for the memory operations. For example, the error measure can include a BEC, a BER, etc. The error measure can correspond to one or more units or groupings within the memory cells of the memory components 112A to 112N. For example, the error measure can be for one or more memory pages, word-line groups, memory components, or any combination thereof corresponding to the memory cells. Also for example, the error measure can correspond to the page type (e.g., LP, UP, XP, TP, etc. depending on the memory type). The error measure can be calculated or tracked by the host device 120, the controller 115, or a combination thereof.

Figure 3B:
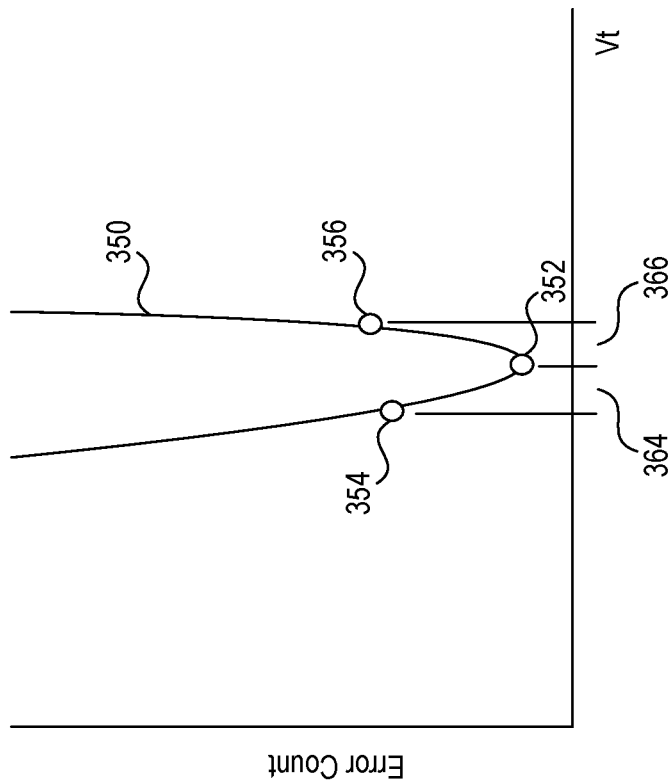
FIGS. 3A and 3B illustrate error count distributions, in accordance with some embodiments of the present disclosure.
Figure 3A:
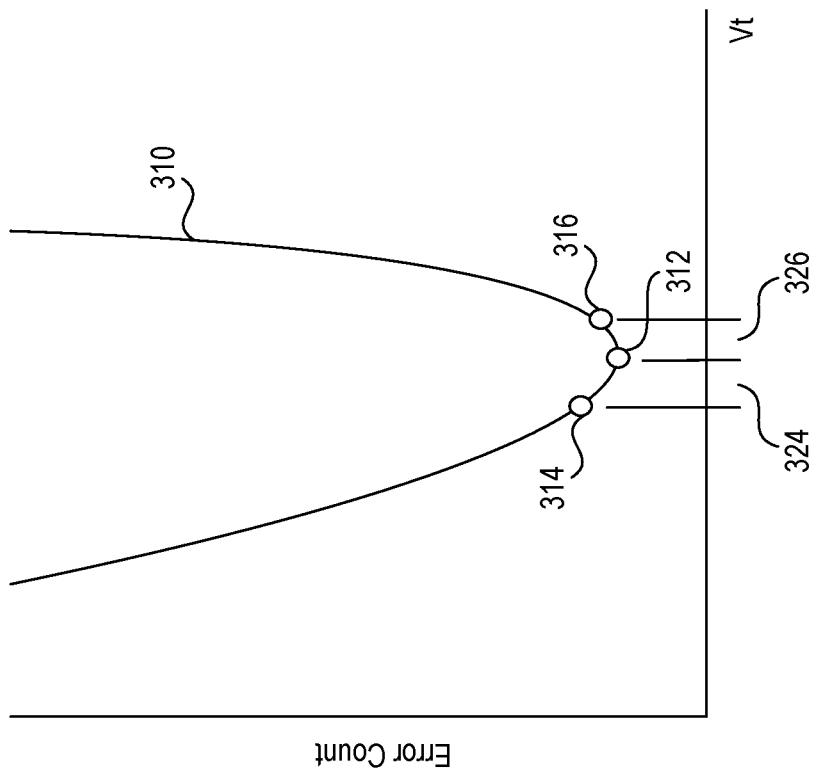

FIGS. 3A and 3B illustrate example error count distributions 310, 350, respectively, that can be used by the DPT component 113 (or another operation) to generate feedback information to be used by the DPT component for adjusting (e.g., equalizing) an error measure (e.g., BEC, BER, etc.) between memory pages and/or the RWB within a memory page during memory operations in the memory sub-system 110. In exemplary embodiments, the error count distributions 310, 350 in FIGS. 3A and 3B, respectively, can represent error counts of program distributions within a same page in the memory cells (e.g., UP, XP, TP, etc. based on the memory type). The y-axis of the error count distributions 310, 350 represents the error count (e.g., a BER, BEC, etc.) of the memory operation on memory cells corresponding to a respective program distribution, and the x-axis represents the threshold voltage levels Vt used in the memory operation for the respective program distribution. FIG. 3A can represent an error count distribution corresponding to a program distribution having a wide valley, and FIG. 3B can represent an error count distribution corresponding to a narrow valley. Because its distribution valley is wide, error count distribution 310 has a larger RWB relative to the RWB of error count distribution 350. In some embodiments, the error count distributions 310, 350 can be the error counts corresponding to read operations. The error count distributions 310, 350 can be created by operations, e.g., read calibration operations, executed by the host device 120, the controller 115, or a combination thereof.

The error count distributions 310, 350 can be based on error count data corresponding to multiple memory operations on a group of memory cells. In some embodiments, information from read operations can be used to generate the error count distributions 310, 350. For example, a memory page in the group of memory cells can be randomly selected, and using a read level voltage corresponding to a program distribution level for the memory page, the selected memory page can be sampled and an error count determined. After multiple memory operations, the error count distributions 310, 350 can be generated. The error count distributions 310, 350 can be based on the component, the page type (e.g., LP, UP, and/or XP for a TLC type memory cells), the WLG, the level (e.g., L0 to L7 for TLC type memory cells), or any combination thereof. For example, in some embodiments, the error count distributions 310, 350 can be based on each page-type for each WLG. In the examples of FIGS. 3A and 3B, the error count distributions 310, 350 can correspond to read operation error data for two separate logic levels from a same page type (e.g., a UP page or an XP page in TLC memory cells). The shape (e.g., width, depth, slope, symmetry, etc.) of each error count distribution 310, 350 can correlate to the valley shape between adjacent program distributions, which relates to the RWB of the valley.

In some embodiments, the DPT component 113 can sample and/or receive error count readings corresponding to the error count distributions 310, 350, including center error count readings 312 and 352 as respectively illustrated in FIGS. 3A and 3B. The error count distributions 310, 350 can be stored in the host device 120, local memory 119, one or more of memory components 112A to 112N, another memory location of the memory sub-system 110, or any combination thereof.

When calibration operations are performed, the center error count readings 312, 352 can correspond to a processing level voltage having the lowest error count. In some embodiments, the center error count readings 312, 352 can correspond to a read level voltage (e.g., a read level derived from a read calibration operation) that can be used in read operations for that page. In some embodiments, the center error count readings 312, 352 can be used as feedback data that can be used by the DPT component 113 to equalize the error measures (e.g., BEC, BER, etc.) between page types of a group of memory cells (e.g., equalize the error measure between LP, UP, and XP pages of a WLG in TLC memory).

However, even with the error measure equalized between page types of a group of memory cells, the performance of the memory sub-system 110 can still be less than optimal because the RWB magnitudes of valleys within each page type of the group of memory cells may not be balanced. To optimize the error measure in the memory sub-system 110, the RWB magnitudes of the valleys within each page type (e.g., within UP pages and within XP pages of TLC memory cells) should be balanced, along with equalizing the error measure between page types. Because a valley shape (e.g., width, depth, slope, symmetry, etc.) is closely related to RWB, matching the valley shapes within each page type will also mean balancing the RWB within each page type.

To determine valley shapes, the DPT component 113 can sample and/or receive a set of error count readings corresponding to the error count distributions 310, 350. As shown in FIGS. 3A and 3B, each set of readings can respectively include a center error count reading 312, 352, as discussed above, a first error count reading 314, 354, and a second error count reading 316, 356. The first error count readings 314, 354 are sampled at processing level voltages that are offset from the respective center processing level voltage by predetermined voltage magnitudes in a negative voltage direction, as shown by first offsets 324, 364 in FIGS. 3A and 3B, respectively. The second error count readings 316, 356 are sampled at processing level voltages that are offset from the respective center processing level voltage by predetermined voltage magnitudes in a positive voltage direction, as shown by second offsets 326, 366, respectively.

Each of the first offsets 324, 364 and the second offsets 326, 366 can have a predetermined magnitude that ranges from, for example, 10 ticks to 50 ticks. As discussed above, a tick can correspond to a minimum threshold voltage adjustment of the memory sub-system 110 (e.g., due to the granularity of an analog-to-digital converter (ADC)). A tick can be, for example, in a range of 10 mV to 20 mV. In some embodiments, the first offset is equal in magnitude to the second offset. In other embodiments, the first and second offset magnitudes can be different.

Once a set of the first, center, and second error count readings for an error count distribution 310, 350 have been collected, a differential error count (Diff-EC) can be calculated by the DPT component 113 (and/or another operation, such as, e.g., a read level calibration operation) based on a difference between the center error count reading and a mean of the first and second error count readings. Diff-EC is a measure of the valley shape with a larger Diff-EC value corresponding to a narrower valley shape. Because the RWB magnitudes of valleys in a page type correspond to the shape of the valleys, equalizing the Diff-EC values within a page type (e.g., within a UP page and within an XP page for TLC memory cells) also means that the RWB magnitudes of the respective valleys will be balanced.

In some embodiments, information based on the center error counts 312, 352 and/or the Diff-ECs for the error count distributions 310, 350 can be used as feedback information by the DPT component 113 to equalize an error measure (e.g., BEC, BER, etc.) for memory cells during memory operations. In some embodiments, the magnitudes of the first offsets 324, 364 and/or second offsets 326, 366 can be adjusted either manually (e.g., by a user) or automatically (e.g., by the DPT component 113 or another operation) to optimize the center error reading and/or the Diff-EC calculation information to the DPT component 113. For example, for a page type that initially has narrow valleys, the DPT component 113 can use small offset magnitudes and still calculate a Diff-EC value that can accurately identify the shape of the valley. However, as the valleys widen (e.g., due to equalizing the error measure), the DPT component 113 may need to use larger offset magnitudes in order for the Diff-EC value to identify the valley shape. In some embodiments, after a plurality of center error count readings 312, 352 are sampled and a plurality of Diff-EC values are calculated, an averaged center error count reading based on the plurality of center count readings 312, 352 and an averaged Diff-EC value based on the plurality of Diff-EC values can be used as the feedback information by the DPT component 113.

In some embodiments, the DPT component 113 can receive the feedback information (e.g., the center error count reading and/or the Diff-EC value) and use the feedback information to shift program distributions (e.g., by changing PV target levels) in order to equalize the error measure (e.g., BEC and/or BER) in the memory cells. At least a portion of the information relating to the instructions for shifting the program distribution can be stored in a data-structure (e.g., an LUT) that is operably connected to the DPT component 113. The portion of the instructions stored in the data-structure (e.g., LUT) are hereinafter referred to as "rules" or "program distribution rules." In some embodiments, the program distribution shift information is based on the page type (e.g., UP, XP, and/or the TP page, as appropriate based on memory type) and relative to the LP page. For example, QLC memory cells can have a set of rules for the LP-UP page set that adjusts the UP page program distributions relative to the LP page, a set of rules for the LP-XP page set that adjusts the XP page program distributions relative to the LP page, and a set of rules for the LP-TP page set that adjusts the TP page program distributions relative to the LP page. In some embodiments, a single data-structure (e.g., LUT) can include the program distribution rules for all page sets of one or more memory types (e.g., MLC, TLC, QLC, etc.). In some embodiments, the data-structures (e.g., LUTs) can be configured such that each data-structure (e.g., LUT) stores the program distribution rules for a single page set (e.g., an LP-UP page set, an LP-XP page set, or an LP-TP page set as appropriate depending on memory type). In some embodiments, the memory sub-system 110 (or host system 120) can store multiple data-structures (e.g., LUTs) with each data-structure storing the program distribution rules for a page type, a memory type, or a combination thereof. In some embodiments, the rules accessed by the DPT component 113 include at least information on the magnitude and direction for shifting each program distribution and/or bandwidth for each program distribution shift. The DPT component 113 can perform continuous, period, and/or on-demand calibrations to balance the error measure (e.g., BEC. BER, etc.) between the pages (e.g., LP, UP, XP, and TP depending on the memory type) of the memory cells and/or balance the RWB magnitudes of valleys within each page.

The data-structure based DPT component of the present disclosure allows for the DPT component firmware code to be reduced because a small collection of code routines can be used with multiple memory types (e.g., SLC, MLC, TLC, QLC, etc.) by just interchanging the data-structures and/or changing the pointers to data-structures to select the desired data-structures. The data-structure based DPT component is robust and requires less memory resources than hard coding all the rules. In addition, by using a data-structure for storing rules rather than hard-coding them, the rules can be changed as desired without recoding the firmware algorithm and/or having to perform extensive code testing on the firmware. The data-structure of the present disclosure also provides greater flexibility than a hard-coded algorithm. In some embodiments, the data-structures and/or associated rules can be added, edited, and/or deleted either manually by a user (static control) and/or automatically by the memory sub-system 110 and/or the host 120 (dynamic control). For example, because program distribution characteristics can change over time, the memory sub-system 110 can use dynamic state space observer control based on, for example, disturbs, retention, and/or program/erase cycling limits, to add, edit, and/or delete data-structures and/or the associated rules detailing the magnitude and direction for shifting the program distributions and/or bandwidth for the program distributions as desired to optimize performance of the memory sub-system 110. In some embodiments, multiple sets of data-structures having multiple sets of rules can be used throughout the lifetime of the memory sub-system 110. For example, when one or more target levels reach a predetermined threshold value due to, for example, a change in the program distribution characteristics, the appropriate data-structure or data-structures can be modified and/or switched. In some case, the data-structures can be modified or switched based on the usage and/or remaining life of the memory sub-system 110. For example, to maintain optimum performance of the memory sub-system 110, a first set of data-structures with a first set of program distribution rules can be used when the memory sub-system 110 is new, a second set of data-structures with a second set of program distribution rules can be used during mid-life of the memory sub-system 110, and a third set of data-structures with a third set of program distribution rules can be used at the end-of-life of the memory sub-system 110.

An example set of rules for shifting the program distributions for an LP-UP page set and an LP-XP page set in a TLC memory type is described with reference to Table 1. For example, the information in at least columns L1 to L7 can be incorporated to a data-structure as rules to provide instructions to the DPT component 113 on how to shift the appropriate program distribution. For example, the data in columns L1 to L7 of Table 1 provides the magnitude and direction the PV target levels (and thus the program distributions) should be shifted based on error distributions of memory operations (see, e.g., error distributions 310, 350). In columns L1 to L7, a "+1" value for a program distribution means that the PV target level (or threshold target voltage) for that program distribution L1 to L7 should be shifted by 1 tick in the positive voltage direction. A "−1" for a program distribution means that the PV target level should shifted in the negative voltage direction by 1 tick. A tick is the minimum voltage adjustment that the memory sub-system 110 can provide and can be a value in a range of 10 mV to 20 mV. A "0" in columns L1 to L7 means that no adjustment is made and that program distribution is fixed.

TABLE 1

|  | BER Center EC | Case No. | RWB Diff-EC | L1 | L2 | L3 | L4 | L5 | L6 | L7 |
|---|---|---|---|---|---|---|---|---|---|---|
| LP-UP | UP > LP | 1 | V2 Largest | 0 | +1 | +1 | 0 | 0 | 0 | 0 |
|  |  | 2 | V6 Largest | 0 | 0 | 0 | −1 | −1 | 0 | 0 |
|  | LP > UP | 3 | V2 Smallest | 0 | −1 | −1 | 0 | 0 | 0 | 0 |
|  |  | 4 | V6 Smallest | 0 | 0 | 0 | +1 | +1 | 0 | 0 |
| LP-XP | XP > LP | 5 | V3 Largest | 0 | 0 | +1 | 0 | 0 | 0 | 0 |
|  |  | 6 | V5 Largest | 0 | 0 | 0 | −1 | 0 | 0 | 0 |
|  |  | 7 | V7 Largest | 0 | 0 | 0 | −1 | −1 | −1 | 0 |
|  | LP > XP | 8 | V3 Smallest | 0 | 0 | −1 | 0 | 0 | 0 | 0 |
|  |  | 9 | V5 Smallest | 0 | 0 | 0 | +1 | 0 | 0 | 0 |
|  |  | 10 | V7 Smallest | 0 | 0 | 0 | +1 | +1 | +1 | 0 |

In some embodiments, the DPT component 113 receives the center error count from the target levels corresponding to memory operations such as, for example, read levels when performing read operations, as discussed above with respect to FIGS. 3A and 3B. Based on the center error count for a given target level, the DPT component 113 updates the LP-UP page set by determining which page between LP and UP has the higher BER. For clarity, BER is used in the description but other error criteria that relate to the error measure of the memory operation can be used. Case nos. 1 and 2 of Table 1 are followed when the UP page has a higher BER than the LP page. The DPT component 113 then determines which case no. (1 or 2) to apply by checking which UP valley has the higher Diff-EC value. As seen in FIGS. 3A and 3B, a larger Diff-EC value equates to a valley shape that is narrower, which corresponds to a smaller RWB magnitude. The DPT component 113 attempts to equalize the RWB magnitude between valleys of the same page by broadening the valley having the largest Diff-EC (smaller RWB). Accordingly, to equalize the RWB between valleys V2 and V6 of the UP page, the DPT component 113 will select case no. 1 if V2 has the largest Diff-EC and case no. 2 if V6 has the largest Diff-EC. If case no. 1 is selected, the target levels (which can be, e.g., PV target levels) for the L2 and L3 program distributions are shifted by 1 tick in the positive voltage direction. If case no. 2 is selected by the DPT component 113, then the target levels for the L4 and L5 program distributions are shifted by 1 tick in the negative voltage direction. If the LP page has a higher BER than the UP page, the DPT component 113 can execute similar instructions but instead of selecting a UP valley with the higher Diff-EC, the DPT component 113 selects a UP valley with the smallest Diff-EC in order to narrow the UP valley so that the LP valley V4 can be broadened.

The instructions for shifting the program distributions for the LP-XP page set are similar to those given above for the LP-UP page set. However, for the XP page, there are three XP valleys that must be checked for the RWB magnitude. In some embodiments such as that shown in Table 1, the XP valley V1 is not used in the RWB checks and the XP valley V1 is also not adjusted. However, in some embodiments, the XP valley V1 can be used and/or adjusted. Similarly, although program distributions L0, L1, and/or L0 are fixed (not shifted) in some embodiments (such as the embodiment of Table 1), in other embodiments, one or more of the program distributions L0, L1, and L7 can be shifted.

In some embodiments, the LP-UP update can be performed in the same operation cycle (e.g., a program/erase cycle) as the LP-XP update. In other embodiments, the LP-UP update and the LP-XP update are performed in different operation cycles. In some embodiments, the LP-UP and LP-XP updates are performed in alternate operation cycles (e.g., in alternate program/erase cycles). In the above disclosure, although a single LP-UP and LP-XP update cycle was discussed, in some embodiments, multiple update cycles may be performed via iteration before the BER is equalized between page types (e.g., page types within a WLG) and/or the RWB magnitudes are equalized within the same page type. In addition, although the above discussion centered around a TLC memory type with LP, UP, and XP pages and program distributions L1 to L7, the rules for shifting program distributions in a QLC memory type with LP, UP, XP, and TP pages and program distributions L1 to L15 can be created in a similar manner.

In some embodiments, the rules for shifting the program distributions can have symmetry. For example, as seen in Table 1, the rules for shifting the program distributions case nos. 3 and 4 are the same as the rules for case nos. 1 and 2 but have an opposite polarity. Case nos. 5-7 and case nos. 8-10 for the LP-XP update have a similar opposite-polarity symmetry. Due to this symmetry, the instructions for cases nos. 3 and 4 (or 1 and 2) and the instructions for case nos. 8-10 (or 5-7) do not have to be included in the data-structure, which can save memory resources in the memory sub-system 110. In some embodiments, where the rules include a symmetry, the data-structure (e.g., LUT) can be configured to include only half the rules. In such embodiments, the DPT component 113 can be configured to change the polarity (direction) of the target level shift as appropriate depending on the case no.

As seen in Table 1, each program distribution (e.g., L1 to L7) can be shifted independently of the others by providing the magnitude and direction in ticks (or some other voltage measure) in the appropriate location in the data-structure. In Table 1, the bandwidth (rate) of the shift, when non-zero, is the same for all the program distributions, which is 1 tick. The bandwidth, however, can also be set independently for each program distribution and can also include sub-tick increments. As seen in Table 2, the bandwidths for program distributions L2 and L3 in case no. 1 are 1.1 ticks, which means that the bandwidth (or rate) is faster (10% faster) than a program distribution having a 1 tick bandwidth. The extra 0.1 tick, however, is not immediately applied to the target level of the memory operation (e.g., PV operations) because the memory sub-system 110 can only increment or decrement target levels by a minimum of 1 tick. This means that for the first 9 update cycles (e.g., during program/erase cycles) in which case no. 1 is selected by the DPT component 113, the target levels for L2 and L3 memory operations are only shifted by 1 tick. On the tenth update cycle that case no. 1 is selected (assuming there are no increments or decrements to the L2, L3 sub-tick counts based on case no. 3 or another case no.), the target levels for L2 and L3 are shifted by 2 ticks. Similarly, the shift for program distribution L3 for case 5 is 0.5 ticks. This means that two update cycles for case 5 are needed before the target voltage level for L3 is shifted by 1 tick (assuming there are no increments or decrements to the L3 sub-tick count based on case no. 8 or another case no.). The DPT component 113 (or another operation) can keep track of sub-tick increments and decrements for each program distribution in memory (e.g., local memory 119, other memory in sub-system 110, one or more memory components 112A to 112N, or any combination thereof) until a full tick for that program distribution is accumulated.

TABLE 2

| | BER Center EC | Case No. | RWB Diff-EC | L1 | L2 | L3 | L4 | L5 | L6 | L7 |
|---|---|---|---|---|---|---|---|---|---|---|
| LP-UP | LP < UP | 1 | V2 Largest | 0 | +1.1 | +1.1 | 0 | 0 | 0 | 0 |
| | | 2 | V6 Largest | 0 | 0 | 0 | −1 | −1 | 0 | 0 |
| | LP > UP | 3 | V2 Smallest | 0 | −1.1 | −1.1 | 0 | 0 | 0 | 0 |
| | | 4 | V6 Smallest | 0 | 0 | 0 | +1 | +1 | 0 | 0 |
| LP-XP | LP < XP | 5 | V3 Largest | 0 | 0 | +0.5 | 0 | 0 | 0 | 0 |
| | | 6 | V5 Largest | 0 | 0 | 0 | −1 | 0 | 0 | 0 |

TABLE 2-continued

| BER Center EC | Case No. | RWB Diff-EC | L1 | L2 | L3 | L4 | L5 | L6 | L7 |
|---|---|---|---|---|---|---|---|---|---|
|  | 7 | V7 Largest | 0 | 0 | 0 | −1 | −1 | −1.1 | 0 |
| LP > XP | 8 | V3 Smallest | 0 | 0 | −0.5 | 0 | 0 | 0 | 0 |
|  | 9 | V5 Smallest | 0 | 0 | 0 | +1 | 0 | 0 | 0 |
|  | 10 | V7 Smallest | 0 | 0 | 0 | +1 | +1 | +1.1 | 0 |

Figure 4A:
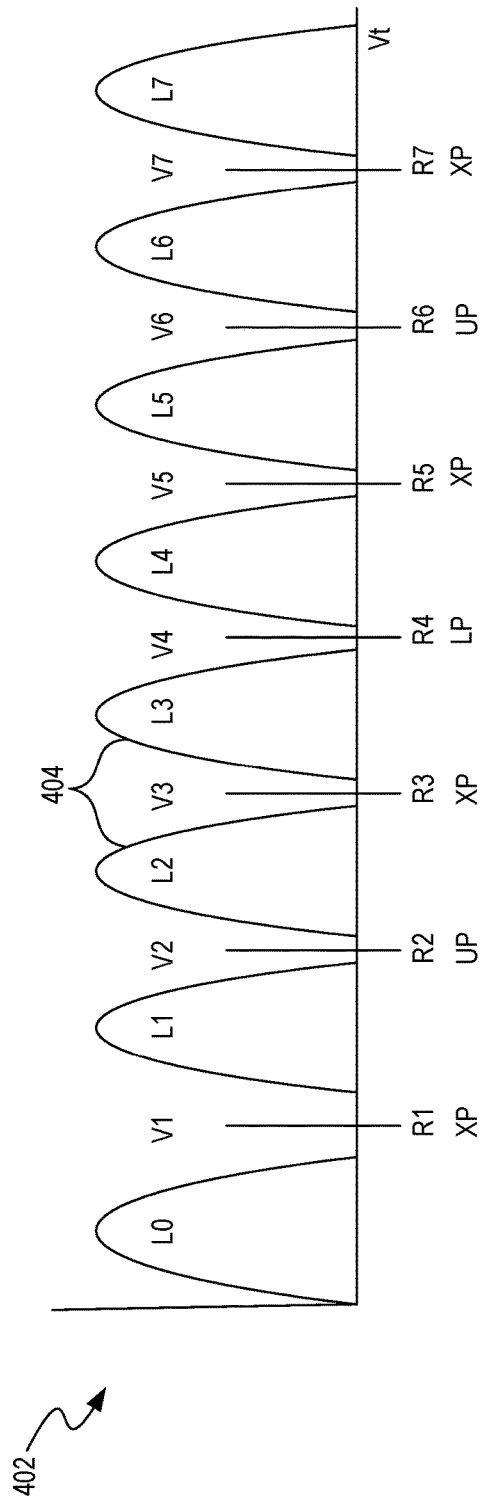
Figure 4B:
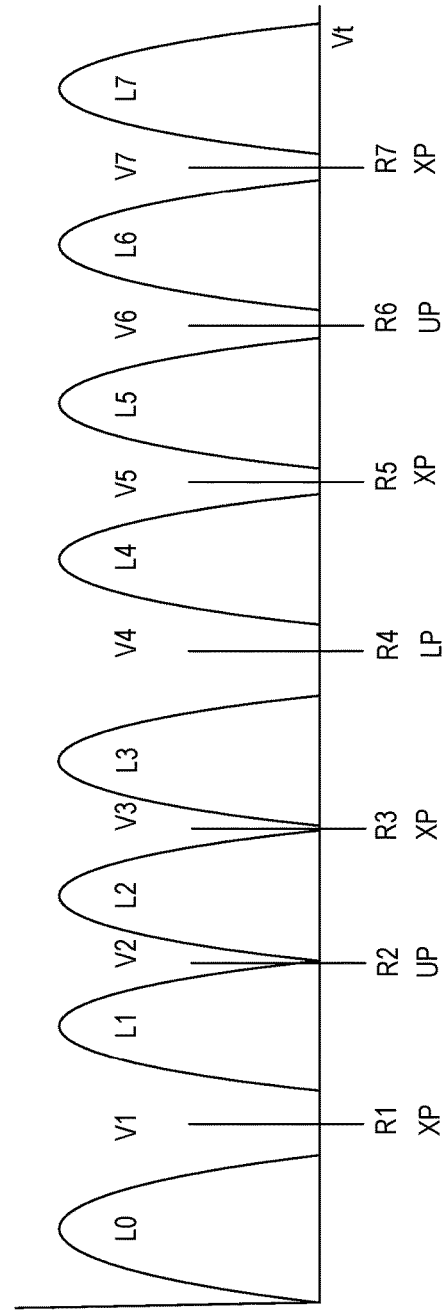

An example case of how the program distributions are shifted is discussed with reference to FIGS. 4A to 4D and Table 1. FIG. 4A illustrates an example of a program distribution profile 402 having program distributions 404 that correspond to logic levels L0 to L7 in TLC type memory cells. The program distribution profile 402 can be a calibrated profile that is the result of, for example, a read level calibration and/or a PV target level calibration performed on one or more of the memory components 112A to 112N such that the BER between page types LP, UP, and XP and the RWB magnitude of valleys V1 to V7 have been optimized. As discussed above, during operation, one or more of the program distributions can shift so that an error measure for the appropriate target level (e.g., read levels R1 to R7) during memory operations (e.g., a read operation) causes performance and/or reliability problems. For example, as seen in FIG. 4B, the program distributions for L2 and L3 have moved to the left relative to FIG. 4A so that at least valleys V2 and V3 have narrowed and valley V4 has widened. The shift in program distributions L2 and L3 can mean that the read levels R2 and R3 might experience higher error counts. In addition, the RWB magnitudes of UP page valleys V2 and V6 are no longer balanced and the RWB magnitudes of XP valleys V3, V5, and V7 are no longer balanced. In some embodiments, the program distribution L0 and XP valley V1, which relate to the erased state, are not monitored and are also not adjusted based on the error measure. That is, in some embodiments, only the program distributions L1 to L7 can be adjusted for BER and only valleys V2 to V7 may be adjusted for RWB.

In the example of FIG. 4B, because the memory cells are TLC type, the DPT component 113 must balance the BER between the LP and UP pages and the BER between LP and XP pages while balancing the RWB magnitudes between the valleys V2 to V7. To balance the BER between page types (e.g., between page types in each WLG) and the RWB magnitudes within a page type, one or more of the program distributions L1 to L7 can be adjusted, as discussed below. In some embodiments, the program distributions L1 and L7 are fixed for better reliability of the memory sub-system 110 and only program distributions L2 to L6 can be adjusted. However, in other embodiments, one or both of L1 and L7 can be adjusted.

Turning to FIG. 4B, the program distributions of L2 and L3 have shifted in the negative voltage direction. To equalize the BER between the LP and UP pages (e.g., between the LP and UP pages in each WLG), the DPT component 113 determines which page has the worst BER (e.g., compare the center error count of R4 (LP page) to the worst center error count of R2 or R6 (UP page)). If the BERs for the LP and UP pages are already equalized, e.g., within a predetermined value of each other, no PV target level shift is performed. In the example of FIG. 4B, the shifting of program distributions L2 and L3 (e.g., compare program of FIG. 4A to FIG. 4B) will likely cause the BER of R2 to be larger than R4 and thus the BER of the UP page will be higher than the LP page. As seen in Table 1, this condition will correspond to either case no. 1 or case no. 2, which means that the LP valley V4 will be decreased. Case no. 1 indicates that the PV target levels for L2 and L3 should be increased, and case no. 2 indicates that the PV target levels for L4 and L5 should be decreased.

To see which case no. (1 or 2) should be applied, the DPT component 113 checks to see which UP valley has the larger Diff-EC value. In the present example, as shown in FIG. 4B, the UP valley V2 is narrower than UP valley V6 and thus will likely have the larger Diff-EC value. Based on the comparison between the Diff-EC values of V2 and V6, the DPT component 113 will follow case no. 1, which means that the PV target levels for program distributions L2 and L3 will be shifted in the positive voltage direction by 1 tick. The +1 tick shift program distributions L2 and L3 is shown in FIG. 4C.

After the update is made for the LP-UP page set, the DPT component 113 can perform an update on the LP-XP page set in, for example, the next operation cycle (e.g., a program/erase cycle). Similar to the LP-UP update, to equalize the BER between the LP and XP pages (e.g., between the LP and XP pages in each WLG), the DPT component 113 determines which page has the worst BER (e.g., compare the center error count of R4 (LP page) to the worst center error count of R3, R5, or R7 (XP page)). The center error count for R1 is not used and the valley V1 is not adjusted in this embodiment. If the BERs for the LP and XP pages are already equalized, e.g., within a predetermined value of each other, no PV target level shift is performed. In the example of FIG. 4C, the shifting of program distributions L2 and L3 will likely cause the BER of R3 to be the largest of R3, R5, and R7 and the BER of the XP page to be larger than the LP page. As seen in Table 1, this condition will correspond to either case no. 5, case no. 6, or case no. 7, which means that the LP valley V4 will be decreased. Case no. 5 indicates that the PV target levels for L3 should be increased, case no. 6 indicates that the PV target level for L4 should be decreased, and case no. 7 indicates that the PV target levels for L4, L5, and L6 should be decreased.

To see which case no. (5, 6, or 7) should be applied, the DPT component 113 checks to see which XP valley has the largest Diff-EC value. In the present example, as shown in FIG. 4C, the XP valley V3 is narrower than both V5 and V7 and will likely have the largest Diff-EC value. Based on the comparison between the Diff-EC values of V3, V5, and V7, the DPT component 113 will follow case no. 5, which means that the PV target level for program distribution L3 will be shifted in the positive voltage direction by 1 tick. The +1 tick shift program distribution L3 is shown in FIG. 4D.

Figure 5:
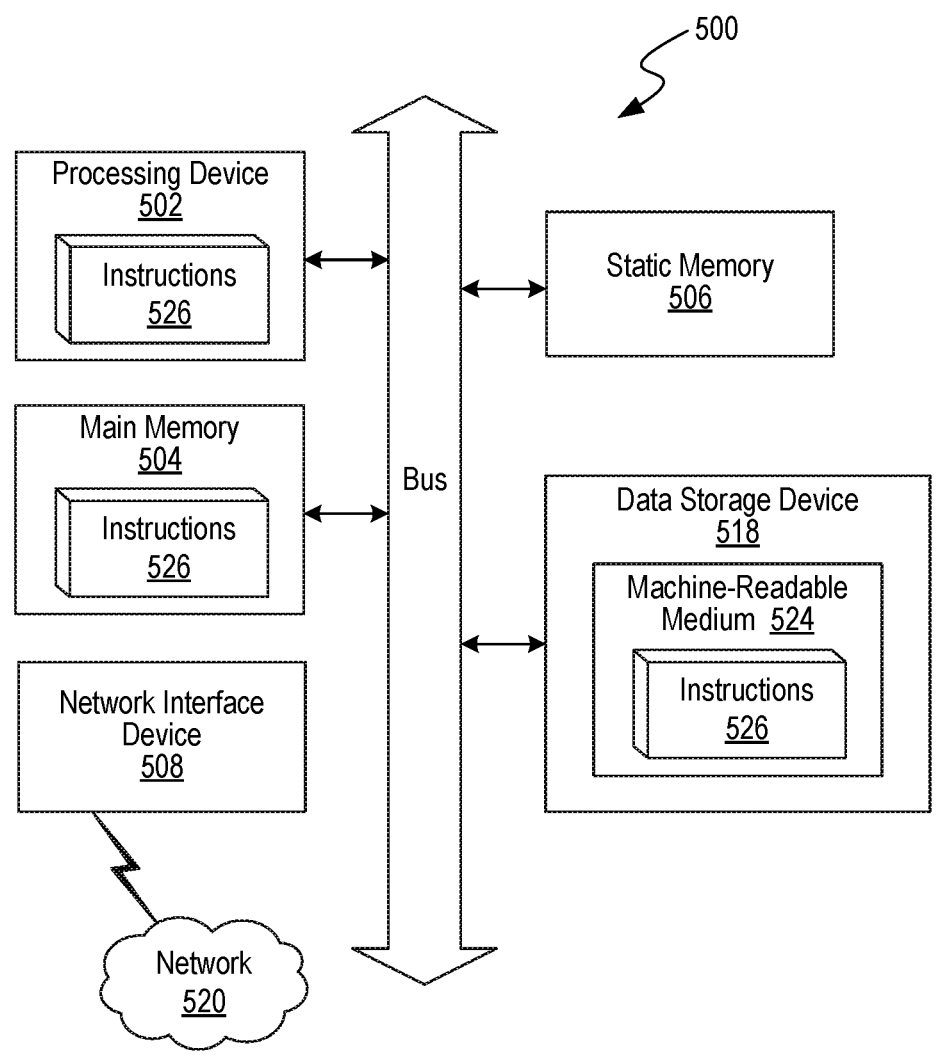
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the DPT component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device can be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage device 618 can include a machine-readable storage medium 524 (also known as a computer-readable medium) on which is stored one or more sets of instructions or software 526 embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage device 518, and/or main memory 504 can correspond to the memory sub-system 110 of FIG. 1.

In one implementation, the instructions 526 include instructions to implement functionality corresponding to program targeting control (e.g., DPT component 113 of FIG. 1). While the machine-readable storage medium 524 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

We claim:

1. A system, comprising:
a memory component including a plurality of memory cells; and
a data-structure corresponding to the plurality of memory cells, the data-structure including information to update a target voltage level corresponding to a memory operation on the plurality of memory cells, the information including at least one program distribution rule for shifting the target voltage level,
wherein the at least one program distribution rule is based on a comparison between a first error feedback corresponding to a first page type and a second error feedback corresponding to a second page type that is different from the first page type, and
wherein the at least one program distribution rule relates to adjusting an error measure between the first page type and the second page type.

2. The system of claim 1, wherein the target voltage level corresponds to a program-verify level.

3. The system of claim 1, wherein the error measure is a bit error rate and each of the first and second error feedbacks is an error count.

4. The system of claim 1, wherein the information stored in the data-structure is trim information that is used for controlling a shifting of a program distribution, including at least one of a magnitude, a direction, or a bandwidth of the shifting.

5. The system of claim 1, wherein the adjusting of the error measure equalizes the error measure between the first page type and the second page type.

6. The system of claim 1, wherein the data-structure is updateable.

7. The system of claim 1, wherein the system is configured to use dynamic state space observer control based on at least one of disturbs, retention, or program/erase cycling limits to at least one of add a second data-structure, edit the at least one program distribution rule in the data-structure, or delete the data-structure.

8. A method, comprising:
receiving in memory operations on a plurality of memory cells a first error feedback corresponding to a first page type and a second error feedback corresponding to a second page type that is different from the first page type, and
updating, based on information stored in a data structure, a target voltage level corresponding to the memory operation on the plurality of memory cells, the information including at least one program distribution rule for shifting the target voltage level,
wherein the at least one program distribution rule is based on a comparison between the first error feedback and the second error feedback, and
wherein the at least one program distribution rule relates to adjusting an error measure between the first page type and the second page type.

9. The method of claim 8, wherein the target voltage level corresponds to a program-verify level.

10. The method of claim 8, wherein the error measure is a bit error rate and each of the first and second error feedbacks is an error count.

11. The method of claim 8, wherein the information stored in the data-structure is trim information that is used for controlling a shifting of a program distribution, including at least one of a magnitude, a direction, or a bandwidth of the shifting.

12. The method of claim 8, wherein the adjusting of the error measure equalizes the error measure between the first page type and the second page type.

13. The method of claim 8, wherein the data-structure is updateable.

14. The method of claim 8, further comprising:
using dynamic state space observer control based on at least one of disturbs, retention, or program/erase cycling limits to at least one of add a second data-structure, edit the at least one program distribution rule in the data-structure, or delete the data-structure.

15. A non-transitory computer-readable storage medium comprising instructions that, when executed by a processing device, cause the processing device to:
receive in memory operations on a plurality of memory cells a first error feedback corresponding to a first page type and a second error feedback corresponding to a second page type that is different from the first page type, and
update, based on information stored in a data structure, a target voltage level corresponding to the memory operation on the plurality of memory cells, the information including at least one program distribution rule for shifting the target voltage level,
wherein the at least one program distribution rule is based on a comparison between the first error feedback and the second error feedback, and
wherein the at least one program distribution rule relates to adjusting an error measure between the first page type and the second page type.

16. The non-transitory computer-readable storage medium of claim 15, wherein the target voltage level corresponds to a program-verify level.

17. The non-transitory computer-readable storage medium of claim 15, wherein the error measure is a bit error rate and each of the first and second error feedbacks is an error count.

18. The non-transitory computer-readable storage medium of claim 15, wherein the information stored in the data-structure is trim information that is used for controlling a shifting of a program distribution, including at least one of a magnitude, a direction, or a bandwidth of the shifting.

19. The non-transitory computer-readable storage medium of claim 15, wherein the adjusting of the error measure equalizes the error measure between the first page type and the second page type.

20. The non-transitory computer-readable storage medium of claim 15, further comprising instructions that, when executed by the processing device, cause the processing device to:
use dynamic state space observer control based on at least one of disturbs, retention, or program/erase cycling limits to at least one of add a second data-structure, edit the at least one program distribution rule in the data-structure, or delete the data-structure.

* * * * *